United States Patent
Myeong et al.

(10) Patent No.: US 8,060,254 B2
(45) Date of Patent: Nov. 15, 2011

(54) METHOD, APPARATUS, AND MEDIUM FOR BUILDING GRID MAP IN MOBILE ROBOT AND METHOD, APPARATUS, AND MEDIUM FOR CELL DECOMPOSITION THAT USES GRID MAP

(75) Inventors: Hyeon Myeong, Yongin-si (KR); Dong-geon Kong, Yongin-si (KR); Su-jinn Lee, Yongin-si (KR); Seok-won Bang, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 428 days.

(21) Appl. No.: 11/654,015

(22) Filed: Jan. 17, 2007

(65) Prior Publication Data
US 2007/0293985 A1    Dec. 20, 2007

(30) Foreign Application Priority Data
Jun. 20, 2006 (KR) .................. 10-2006-0055483

(51) Int. Cl.
*G06F 19/00* (2011.01)
*G05D 1/00* (2006.01)

(52) U.S. Cl. ........ 700/253; 700/245; 700/250; 700/258; 701/23; 701/25; 701/26; 901/1

(58) Field of Classification Search .......... 700/245, 700/250, 253, 258; 701/23, 25, 26, 207; 901/1
See application file for complete search history.

(56) References Cited

U.S. PATENT DOCUMENTS
5,696,675 A    12/1997    Nakamura et al. ..... 364/424.027

FOREIGN PATENT DOCUMENTS
JP    63-265312    11/1988
JP    05-165956    7/1993
(Continued)

OTHER PUBLICATIONS

S. Riisgaard and M. Blas, "Slam for Dummies (A Tutorial Approach to Simultaneous Localization and Mapping)", 2005. Available: http://ocw.mit.edu/NR/rdonlyres/Aeronautics-and-Astronautics/16-412JSpring-2005/9D8DB59F-24EC-4B75-BA7A-F0916BAB2440/0/1aslam_blas_repo.pdf.*

(Continued)

*Primary Examiner* — Thomas Black
*Assistant Examiner* — Peter D Nolan
(74) *Attorney, Agent, or Firm* — Staas & Halsey LLP

(57) ABSTRACT

Provided are a method, apparatus, and medium for building a grid map in a mobile robot and a method, apparatus, and medium for cell decomposition using the grid map building method and apparatus. A mobile robot for building a grid map includes a grid map building unit obtaining grid points by sensing a distance to an external space or obstacle, and building a grid map, a feature point extraction unit extracting feature points from the grid points, a feature point update unit estimating the pose of the robot after the robot moves, and obtaining updated feature points by SLAM (Simultaneous Localization And Map building) algorithm, a transform formula calculation unit calculating a transform formula that transforms feature points extracted by the feature point extraction unit into feature points updated by the feature point update unit, and a grid map update unit updating the grid map according to the obtained formula.

21 Claims, 8 Drawing Sheets

FOREIGN PATENT DOCUMENTS

| | | |
|---|---|---|
| JP | 8-16241 | 1/1996 |
| JP | 09-212238 | 8/1997 |
| JP | 10-307890 | 11/1998 |
| JP | 2001-266130 | 9/2001 |
| JP | 2004-118757 | 4/2004 |
| JP | 2005-128959 | 5/2005 |
| JP | 2005-326944 | 11/2005 |
| JP | 2006-003263 | 1/2006 |
| JP | 2006-012178 | 1/2006 |
| KR | 1019960001808 | 2/1996 |
| KR | 10-2004-0045572 | 6/2004 |
| KR | 10-2005-0024840 | 3/2005 |
| WO | 2005/104737 | 11/2005 |
| WO | 2006/019791 | 2/2006 |

OTHER PUBLICATIONS

J. Djugash, S. Singh, G. Kantor, and W. Zhang, "Range-Only SLAM for Robots Operating Cooperatively with Sensor Networks," In Proc. IEEE Int'l Conference on Robotics and Automation '06, Orlando, Florida, May 2006, pp. 2078-2084.*

W. Huang, "Optimal Line-sweep-based Decompositions for Coverage Algorithms," In Proc. IEEE International Conference on Robotics and Automation '01, 2001, pp. 27-32.*

S. Wong, "Qualitative Topological Coverage of Unknown Environments by Mobile Robots," PhD thesis, University of Auckland, Aucland, NZ, Feb. 2006.*

Z. Lin, S. Kim, and I.S. Kweon, "Recognition-based Indoor Topological Navigation Using Robust Invariant Features", In Proc. IEEE/RSJ Int'l Conference on Intelligent Robots and Systems, Aug. 2005, pp. 2309-2314.*

Choset, H. et al., *Exact Cellular Decompositions in Terms of Critical Points of Morse Functions*, 2000 IEEE International Conference on Robotics and Automation.

Dissanayake, G. et al., *A Solution to the Simultaneous Localization and Map Building (SLAM) Problem*, IEEE Transactions on Robotics and Automation, vol. 17, No. 3, pp. 229-241, Jun. 2001.

Japanese Office Action dated Nov. 24, 2009, issued in corresponding Japanese Application No. 2007-123400.

Japanese Office Action dated Jun. 29, 2010, issued in corresponding Japanese Patent Application No. 2007-123400.

* cited by examiner

ORIGINAL MAP

GRID MAP RECOGNIZED BY ROBOT

METHOD, APPARATUS, AND MEDIUM FOR BUILDING GRID MAP IN MOBILE ROBOT AND METHOD, APPARATUS, AND MEDIUM FOR CELL DECOMPOSITION THAT USES GRID MAP

CROSS-REFERENCE TO RELATED APPLICATIONS

This application claims the benefit of Korean Patent Application No. 10-2006-0055483 filed on Jun. 20, 2006 in the Korean Intellectual Property Office, the disclosure of which is incorporated herein by reference in its entirety.

BACKGROUND OF THE INVENTION

1. Field of the Invention

The present invention relates to a method, apparatus, and medium for building a grid map in a mobile robot and a method, apparatus, and medium for cell decomposition using the grid map building method, apparatus, and medium, and more particularly, to a method, apparatus, and medium by which a grid map of a wide area is built while a robot is traveling, and a method, apparatus, and medium by which the built grid map is decomposed into one or more cells.

2. Description of the Related Art

Generally, robots have been developed as a method in relation to automation of processes in factories or industrial sites. With the development of automatic control technologies and remote control technologies, robots are generally used to work in extreme environments, such as extremely high or low temperatures, to work in dangerous environments, such as in space or undersea environments, or to perform simple and repetitive work.

Recently, in addition to industrial robots used in industrial sites, robots have been commercialized for use as housework or office work assistants in ordinary families or offices. Leading examples of those robots may include cleaning robots, guide robots and security robots.

In the case of a mobile robot, such as a cleaning robot, in order to specify a route for the robot to travel or an area in which the robot is to operate, first, a map which the robot recognizes is required. Generally, in order to build a map which is recognized by the robot, a map prepared by a user in advance is input, or the robot is made to recognize information on the surroundings or the pose of the robot, by using marks that the robot can recognize, on a floor or ceiling, or the robot itself builds a map of an area in which the robot is to operate, by autonomously traveling in the area.

Though various attempts to develop a method of using a robot to build a map while the robot autonomously travels have been made, most methods employ a plurality of sensors, and therefore have uncertainty and errors caused by errors of the sensors. Also, since the area that the robot recognizes with sensors is usually a limited part of an area for which the robot is building a map, even if a good quality grid map is obtained for this limited part, when the map is completed, the overall structure of the grid map becomes different from the actual map.

FIG. 1 is a schematic diagram illustrating the building of a grid map by a robot according to a conventional technology.

For example, if the original map is about a square room as illustrated in FIG. 1, the robot can build a grid map by going around the inside of the room. However, though each side of the grid map built by the robot may correspond to a straight line, the entire grid map may not be recognized as having a square shape. Accordingly, there has been a problem that due to inaccurate grid maps, the robot cannot perform a desired task at a specified pose.

Also, in relation to a space that is the object of a grid map, a method of decomposing the space into a plurality of cells has been preferred. For example, in the case of a cleaning robot, instead of cleaning a wide space at one time, each room or each part of a living room is decomposed into cells and the robot is made to clean each cell. By doing so, the cleaning robot can be made to clean the entire area uniformly and errors in the position or orientation, which increase as the robot travels, can be reduced. This cell decomposition should be performed considering the direction in which the robot is made to clean the space. Accordingly, there have been problems that cell decomposition cannot be performed simply based on an area or a distance, and the cell decomposition should be performed even for identical areas, so that the robot can clean the space efficiently.

Furthermore, when a grid map is built using an inaccurate sensor, edge irregularities are too big, such that the space cannot be easily decomposed into cells according to a conventional method of cell decomposition using critical points.

SUMMARY OF THE INVENTION

Additional aspects, features, and/or advantages of the invention will be set forth in part in the description which follows and, in part, will be apparent from the description, or may be learned by practice of the invention.

The present invention provides a method, apparatus, and medium for building a grid map in a mobile robot and a method, apparatus, and medium for cell decomposition using the grid map building method, apparatus, and medium, in which feature points are made to match a grid map so that a relatively accurate grid map can be obtained, and then, by regarding the feature points as critical points, cell decomposition is performed.

According to an aspect of the present invention, there is provided a method of building a grid map of a mobile robot, the method including obtaining grid points by sensing a distance to an external space or obstacle, and building a grid map; extracting feature points from the grid points; estimating the pose of the robot after the robot moves, and obtaining updated feature points by SLAM algorithm; obtaining a transform formula that transforms the feature points extracted from the grid points into the updated feature points; and updating the grid map according to the obtained formula.

According to another aspect of the present invention, there is provided a mobile robot for building a grid map, the mobile robot including a grid map building unit obtaining grid points by sensing a distance to an external space or obstacle, and building a grid map; a feature point extraction unit extracting feature points from the grid points; a feature point update unit estimating the pose of the robot after the robot moves, and obtaining updated feature points by SLAM algorithm; a transform formula calculation unit calculating a transform formula that transforms feature points extracted by the feature point extraction unit into feature points updated by the feature point update unit; and a grid map update unit updating the grid map according to the obtained formula.

According to another aspect of the present invention, there is provided a method of building a grid map of a mobile robot, including obtaining grid points by sensing a distance to at least one of boundaries of an external space and an obstacle within boundaries of the external space, and building the grid map; extracting feature points from the grid points; estimating pose of the robot after the robot moves, and updating the feature points using a SLAM (Simultaneous Localization And Map building) algorithm; determining a transform which transforms the feature points extracted from the grid points into the updated feature points; and updating the grid map according to the transform.

According to another aspect of the present invention, there is provided a mobile robot for building a grid map, including a grid map builder to obtain grid points by sensing a distance to at least one of boundaries of an external space and an obstacle within boundaries of the external space, and to build the grid map; a feature point extractor to extract feature points from the grid points; a feature point updater to estimate pose of the robot after the robot moves, and updating the feature points by using a SLAM (Simultaneous Localization And Map building) algorithm; a transform determiner to determine a transform which transforms feature points extracted by the feature point extractor into feature points updated by the feature point updater; and a grid map updater to update the grid map according to the transform.

According to another aspect of the present invention, there is provided a method of building a grid map of a mobile robot, including building the grid map based on grid points obtained by sensing a distance from the robot to objects; extracting feature points from the grid points; estimating pose of the robot after robot movement, and updating the feature points using a SLAM (Simultaneous Localization And Map building) algorithm; determining a transform which transforms the feature points extracted from the grid points into the updated feature points; and updating the grid map according to the transform.

According to another aspect of the present invention, there is provided a mobile robot for building the grid map, including a grid map builder to build the grid map based on grid points obtained by sensing a distance from the robot to objects; a feature point extractor to extract feature points from the grid points; a feature point updater to estimate pose of the robot after the robot moves, and updating the feature points by using a SLAM (Simultaneous Localization And Map building) algorithm; a transform determiner to determine a transform which transforms feature points extracted by the feature point extractor into feature points updated by the feature point updater; and a grid map updater to update the grid map according to the transform.

According to another aspect of the present invention, there is provided at least one computer readable medium storing computer readable instructions to implement methods of the present invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
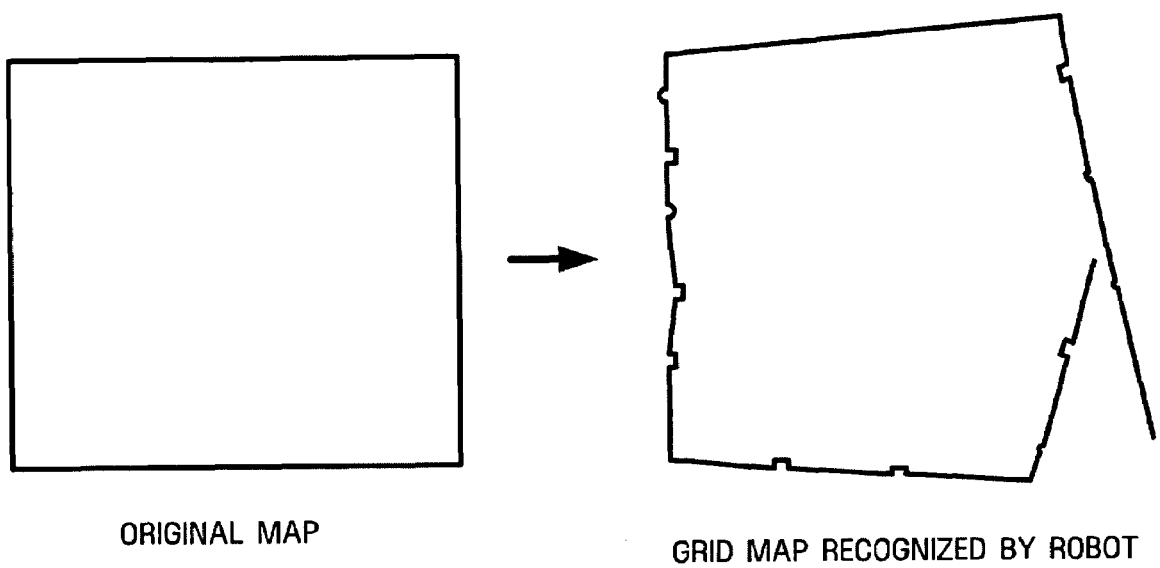
FIG. 1 is a schematic diagram illustrating the building of a grid map by a robot according to a conventional technology.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
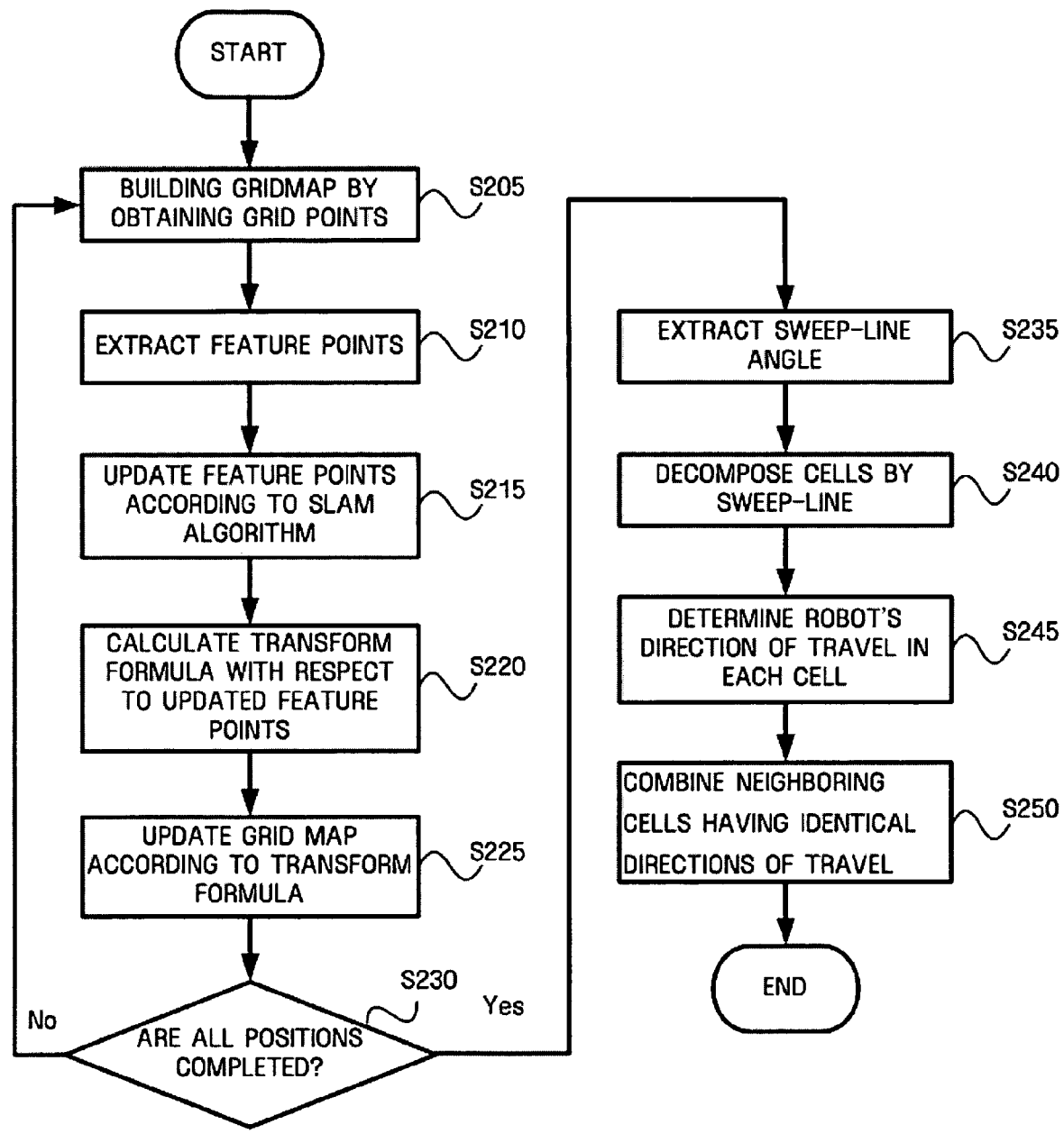
FIG. 2 is a flowchart illustrating a method of cell decomposition that uses a grid map of a mobile robot according to an exemplary embodiment of the present invention.

FIG. 2 is a flowchart illustrating a method of cell decomposition that uses a grid map of a mobile robot 300 according to an exemplary embodiment of the present invention.

The method of cell decomposition using a grid map of a mobile robot 300 according to an exemplary embodiment of the present invention includes: (a) obtaining grid points by sensing a distance to an external space or obstacle, and building a grid map; (b) extracting feature points from the grid points; (c) estimating the pose of the robot 300 after the robot 300 moves, and updating the feature points by SLAM algorithm; (d) obtaining a transform formula that transforms the feature points extracted in operation (b) into the feature points updated in operation (c); (e) updating the grid map according to the obtained formula; (f) extracting an angle of a sweep-line appearing most frequently in the updated grid map; and (g) scanning the grid map according to the extracted sweep-line angle and performing cell decomposition by the sweep-line at a position in which the sweep-line meets a feature point.

First, the mobile robot 300 autonomously travels in an area desired to be searched. The mobile robot 300 has one or more sensors mounted thereon that can sense a distance, such that the mobile robot 300 can sense an obstacle in front of it. In addition, the mobile robot 300 can recognize the structure of an obstacle or the inside walls of a building with respect to the mobile robot by using a distance sensing sensor such as an ultrasound sensor, an infrared ray sensor or laser sensor. An inside wall may be a type of boundary of an external space.

Through this method of recognizing a structure, the distance from the robot to the structure or wall surface is sensed such that a plurality of grid points can be obtained in operation S205. A grid map is spatial information completed by connecting the plurality of grid points recognized while the robot 300 is traveling. Accordingly, the robot 300 obtains grid points, and stores the grid points as data so that a grid map can be built in operation S205. Feature points 310 and 320 can be extracted from the plurality of sensed grid points in operation S210. A feature point denotes a point that can determine a shape, such as an edge or corner of an object.

In order to extract feature points 310 and 320, points of a corner or edge such as an edge part of a building are extracted, and for this purpose, a random sample consensus (RANSAC) or a split and merge algorithm can be used. According to the RANSAC algorithm, based on grid points obtained through distance data, a consensus set of matching obtained grid points are randomly extracted so that a plurality of straight lines satisfying an allowable error range are detected. By recognizing points at which straight lines intersect each other from the plurality of detected straight lines, a corner or an edge is detected and these points are regarded as feature points. According to the split and merge algorithm, extreme points are found and connected to lines. For a point not included in a line and having a value greater than a predetermined error value, the line can be split into detail lines. Between adjacent lines, if the adjacent lines can be recognized as one line, the lines are merged so that the line of an entire shape can be extracted. By doing so, corners or edges are detected and can be regarded as feature points.

While the robot 300 continues to travel and identify its pose, the robot 300 builds a map of the surroundings. The robot 300's pose denotes position and orientation of the robot 300. For this purpose, a simultaneous localization and map building (SLAM) algorithm, which is a method of tracking the pose of a robot 300 and building a map at the same time, can be used. According to the SLAM algorithm, a map of a surrounding environment is built at a predetermined pose and based on the built map, the pose of the robot 300 after it has moved is identified. By repeating this process, the SLAM algorithm estimates the pose of the robot 300 and the map of the surrounding environment at the same time. Accordingly, while the robot 300 continues to travel, feature points can be updated according to the SLAM algorithm in operation S215.

For example, a SLAM algorithm based on an extended Kalman filter (EKF) can be used, as shown by equations 1 and 2 below:

$$x(k+1)=F(k)x(k)+[u(k+1)+v(k+1)] \quad (1)$$

$$z_i(k)=H_ix(k)+w_i(k) \quad (2)$$

Equation 1 shows a traveling model of a robot 300. Here, x(k) is the pose of the robot 300 and positions of feature points at time step k, u(k+1) is a control vector, v(k+1) is a noise vector, and F(k) is a state transition matrix at time step k. Equation 2 is an observation model equation sensing the distance to an i-th feature point while the robot is traveling. Here, w(k) is noise of a measured value, and H is an observation matrix made by the range sensor during the traveling of the robot.

According to the SLAM algorithm, first, the pose of the robot 300 is estimated from the control vector. Then, by using the values measured by sensors with respect to feature values, a covariance matrix can be calculated. Based on the covariance matrix, a Kalman gain is calculated and the pose of the robot 300 and positions of feature points are updated, and then, the covariance matrix is updated. Since the SLAM algorithm is explained in an article, 'A Solution to the Simultaneous Localization and Map Building Problem' IEEE Transactions on Robotics and Automation, Vol. 17, No. 3, June 2001, a detailed explanation of the SLAM will be omitted here.

After the SLAM algorithm is performed, in operation S220, a transform matrix (T) that can transform each feature point can be found. It is assumed that the position of a feature point before the SLAM is performed is (x, y) and the position of each feature point after the SLAM is performed is (x', y'). Position (x', y') after the SLAM is performed can be regarded as a corrected position of the feature point. That is, by updating the position of a feature point, a relatively accurate position of the feature point can be recognized.

Accordingly, a transform matrix (T) to transform the position (x, y) of a feature point before correction into the position (x', y') of a corrected feature point can be obtained. In order to obtain the transform matrix (T), a variety of transform methods can be used. For example, an Affine transform or a linear conformal transform in which the position of a feature point before correction is mapped to the position of a corrected feature point on a one-to-one basis can be used. If the Affine transform is used as the transform method, a transform matrix (T) can be obtained according to equation 3 below:

$$\begin{bmatrix} x' \\ y' \end{bmatrix} = \begin{bmatrix} T_{11} & T_{12} & T_{13} \\ T_{21} & T_{22} & T_{23} \end{bmatrix} \begin{bmatrix} x \\ y \\ 1 \end{bmatrix}. \quad (3)$$

If based on the transform matrix (T) obtained according to equation 3, the transform is performed with respect to the entire area of a grid map, and the entire grid map can be updated. Accordingly, the updated grid map can be updated to suit the already corrected feature points such that the grid map matches the feature point map.

Figure 3:
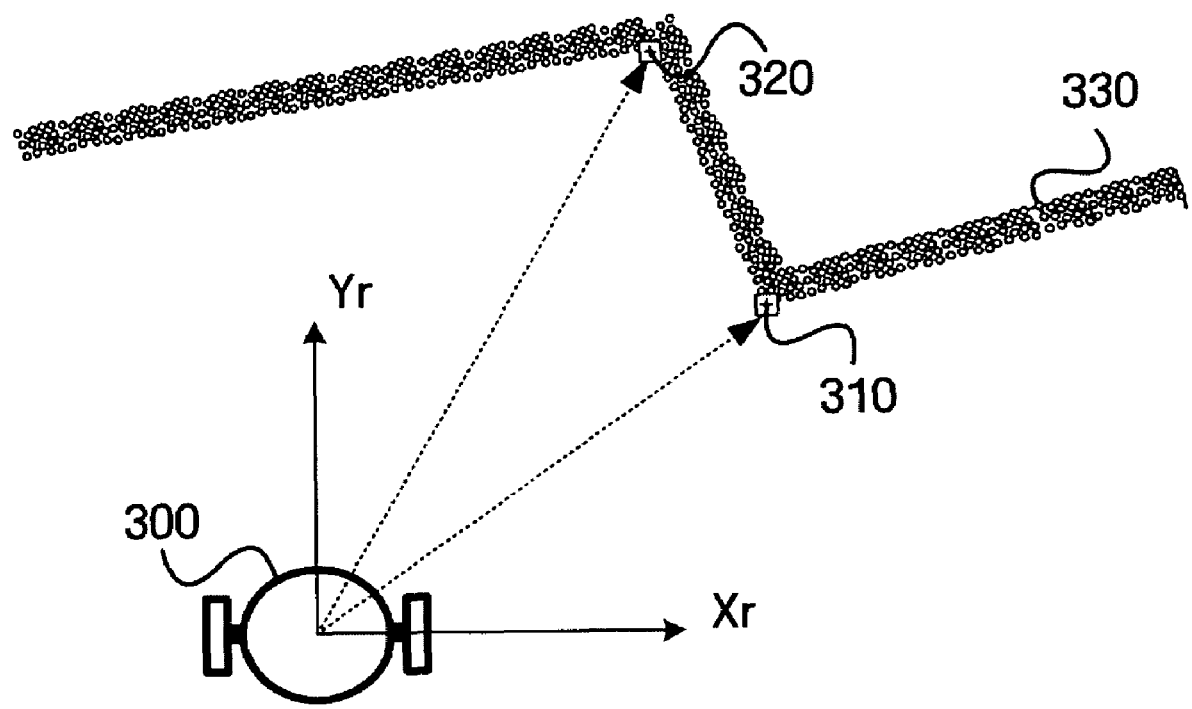
FIG. 3 is a schematic diagram illustrating the positions of feature points in a method of building a grid map of a mobile robot according to an exemplary embodiment of the present invention.
Figure 4A:
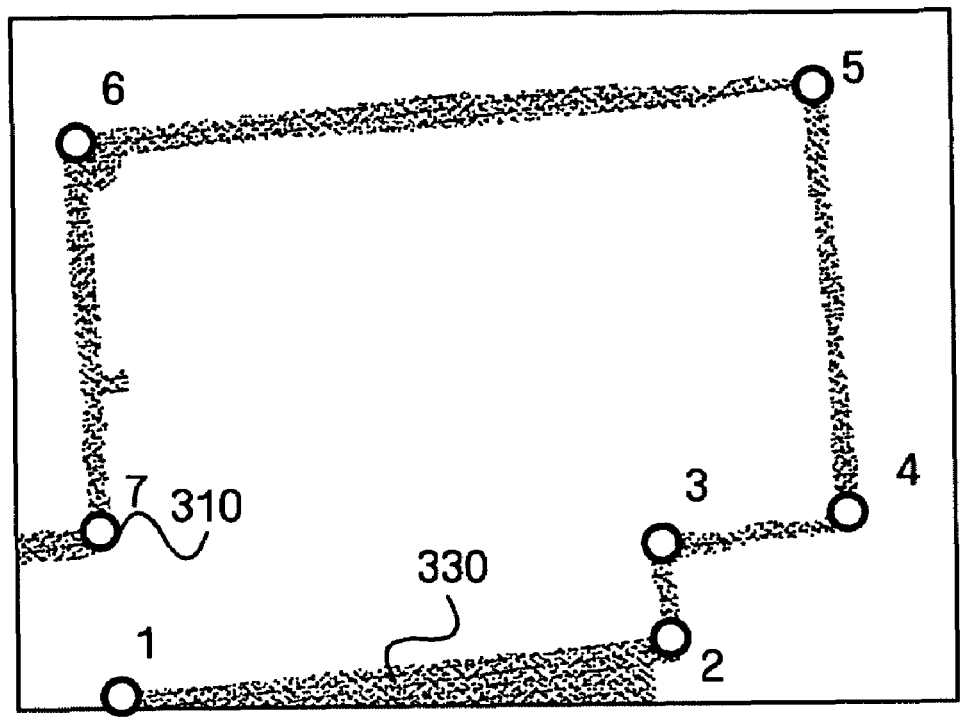
FIG. 4A illustrates a grid map built before transformation in a method of building a grid map of a mobile robot according to an exemplary embodiment of the present invention.
Figure 4B:
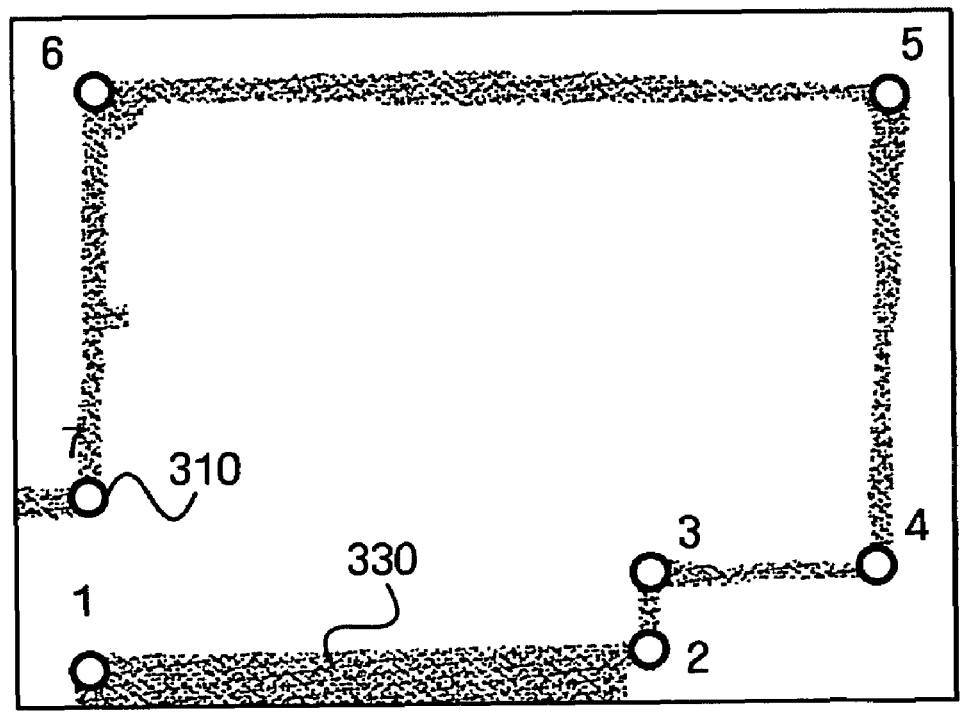
FIG. 4B illustrates a grid map updated according to an Affine transform in a method of building a grid map of a mobile robot according to an exemplary embodiment of the present invention.

FIG. 3 is a schematic diagram illustrating the positions of feature points in a method of building a grid map of a mobile robot 300 according to an exemplary embodiment of the present invention. FIG. 4A illustrates a grid map built before transformation in a method of building a grid map of a mobile robot 300 according to an exemplary embodiment of the present invention, and FIG. 4B illustrates a grid map updated according to an Affine transform in a method of building a grid map of a mobile robot 300 according to an exemplary embodiment of the present invention.

For example, it is assumed that a grid map as illustrated in equation 3 is obtained after a mobile robot 300 travels. FIG. 4A shows the grid map obtained from the sensor of the robot 300 before SLAM correction is performed while the mobile robot 300 is traveling. In the grid map, zones in the space are shown roughly and each feature point is extracted from the zones in the space. For example, if 7 feature points are extracted as illustrated in FIG. 4A, the mobile robot 300 can continuously update each feature point while traveling. While the feature points are being updated, a transform formula that can map feature points before updating to feature points after updating on a one-to-one basis can be obtained. For example, if a transform matrix (T) is obtained using the transform formula of FIG. 3, the updated grid map as illustrated in FIG. 4B can be obtained by transforming the entire grid map by using the transform matrix (T) in operation S225. Compared to the grid map before the update, the boundaries of zones in the updated grid map are less distorted and the updated grid map has a relatively superior quality when completed.

By thus updating the grid map, the building of the grid map can be performed in operation S225. For example, when the robot 300 builds a grid map inside an apartment, first, the robot 300 completes a grid map inside a room, and, then, the robot 300 continuously moves to another room or a living room to extract feature points, obtain a transform matrix and update a grid map. By doing so, a grid map of all the zones inside the apartment is updated. Only after the grid map of all the zones is updated, can the entire grid map be completed. However, when necessary, the robot 300 may build a grid map of part of one room or living room according to the method described above.

Figure 5A:
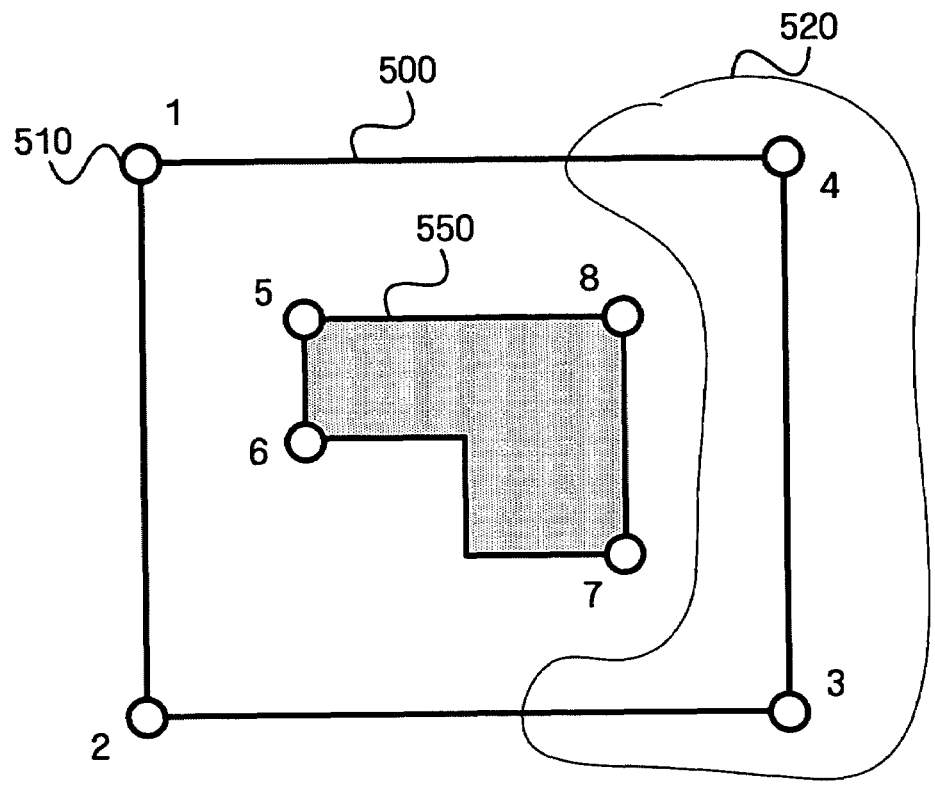
FIG. 5A is a schematic diagram illustrating critical points obtained according to the definition of a critical point in a plane space having an obstacle, according to an exemplary embodiment of the present invention.
Figure 5B:
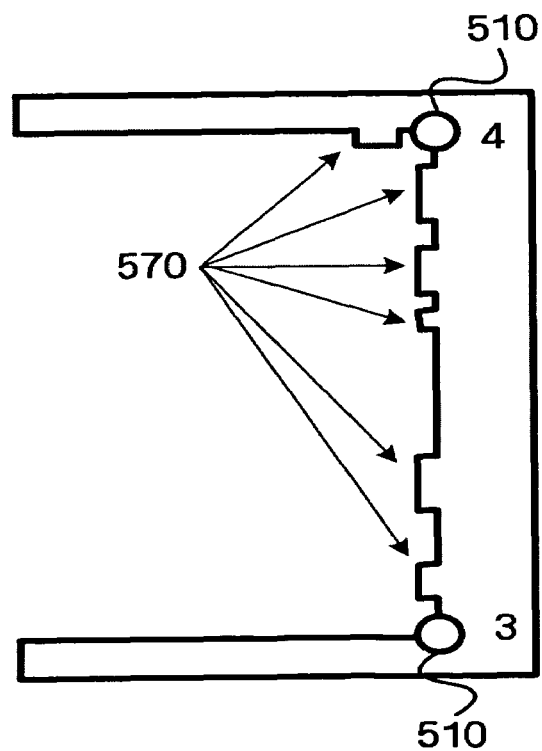
FIG. 5B is a schematic diagram illustrating a grid map of a right-hand side wall surface which is sensed by a robot.
Figure 6:
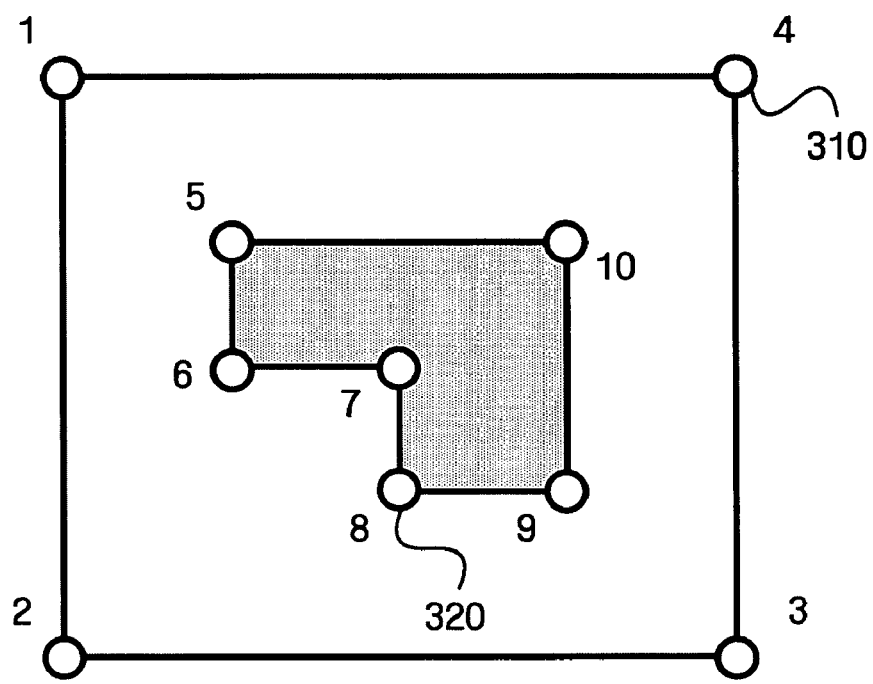
FIG. 6 is a schematic diagram in which feature points are obtained from a plane space having an obstacle according to a method of cell decomposition that uses a grid map of a mobile robot according to an exemplary embodiment of the present invention.
Figure 7:
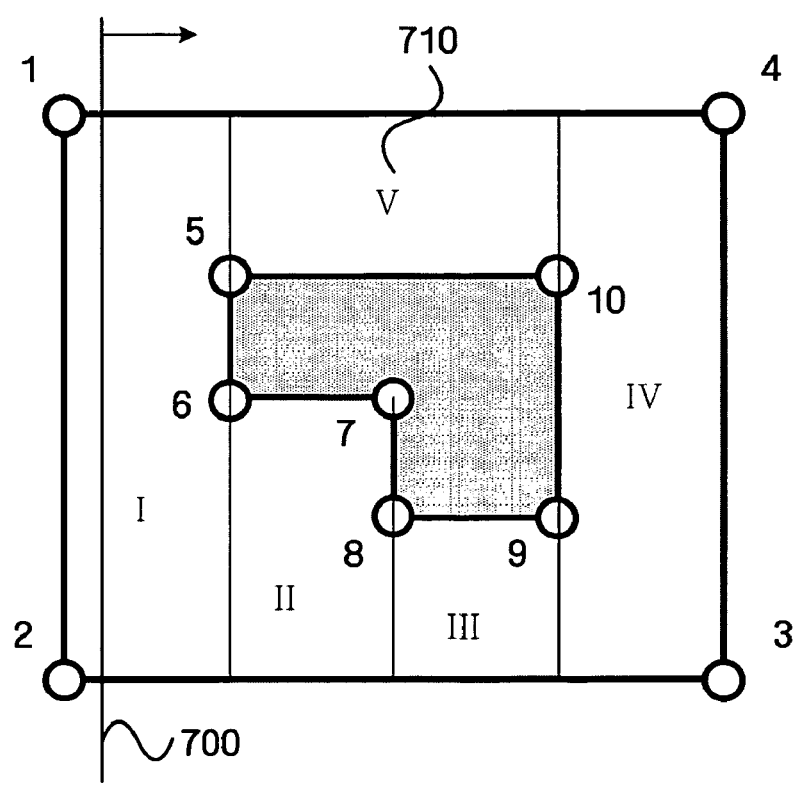
FIG. 7 illustrates decomposition of a cell using a sweep-line in a method of cell decomposition that uses a grid map of a mobile robot according to an exemplary embodiment of the present invention.

FIG. 5A is a schematic diagram illustrating critical points obtained according to the definition of a critical point in a plane space 500 having an obstacle 550, according to an exemplary embodiment of the present invention, and FIG. 5B is a schematic diagram illustrating a grid map of a right-hand side wall surface which is sensed by a robot 300. FIG. 6 is a schematic diagram in which feature points are obtained from a plane space having an obstacle according to a method of cell decomposition that uses a grid map of a mobile robot 300 according to an exemplary embodiment of the present invention. FIG. 7 illustrates decomposition of a cell using a sweep-line in a method of cell decomposition that uses a grid map of a mobile robot 300 according to an exemplary embodiment of the present invention.

After the grid map is built, based on the grid map, the space is decomposed into one or more cells. Generally, a robot 300 determines a sweep-line 700 direction and then, with reference to critical points 510 which the sweep-line 700 meets, the robot 300 can decompose a space into cells 710. Details of a critical point are explained in the article 'Exact Cellular Decompositions in Terms of Critical Points of Morse Functions', by H. Chset, E. Acar, A. Rizzi, and J. Luntz published in 2000 IEEE International Conference on Robotics and Automation.

Generally, a critical point 510 is a position where when a sweep-line is moved in a predetermined direction in a space, the sweep-line meets an obstacle and there are no obstacles below and above the obstacle. For example, if an obstacle 550 is disposed in a square room 500 as illustrated in FIG. 5A, 8 critical points 510 can be extracted. Meanwhile, as illustrated in FIG. 6, 10 feature points may be extracted as described above, so as to include edges and corners in the space. However, in a conventional grid map as illustrated in FIG. 5B, if the right-hand side part 520 of FIG. 5A is enlarged and observed, it can be seen that unnecessarily more critical points 570 are generated due to irregularities caused by sensor errors and more critical points 570 are generated than the 8 critical points in FIG. 5A.

In the present invention, the feature points extracted in the method of building a grid map described above can be regarded as critical points instead of attempting to find critical points. Accordingly, without considering unnecessary critical points 570 generated by the sensor errors, cell decomposition is performed using only feature points 310 and 320 (FIG. 6) required for the cell decomposition. Thus, by scanning the sweep-line in a grid map, a space can be decomposed into one or more cells.

An angle of a sweep-line with respect to the entire grid map is determined in operation S235. An angle of a line appearing most frequently in the entire cell can be obtained by using a variety of methods in the cell of the grid map. For example, one or more lines existing in the cell can be detected, and then the lines can be divided into groups having identical angles, respectively. The angle of a line group having a highest weight among the groups can be determined as the angle of the sweep-line. In order to find the angle of a group having the highest weight, a Hough transform, a Radon transform or a histogram method can be used. The calculated angle can be used as the angle of the sweep-line at the decomposition of the grid map.

By using the thus obtained sweep-line and feature points, the grid map can be decomposed into the cells in operation S240. For example, when the angle of the sweep-line is obtained as 90 degrees as illustrated in FIG. 7, the grid map can be decomposed at positions where feature points meet the sweep-line, by scanning of the sweep-line. When the sweep-line having an angle of 90 degrees scans the inside of the grid map from the left-hand side to the right-hand side, the cell can be decomposed into 5 cells. While scanning the inside of the grid map, the sweep-line may meet one or more feature points, and accordingly, the cell can be decomposed into one or more cells. However, if the sweep-line meets one or more feature points at the same time while scanning the cell, it can be regarded as meeting one feature point so that one cell decomposition operation can be performed.

Figure 8A:
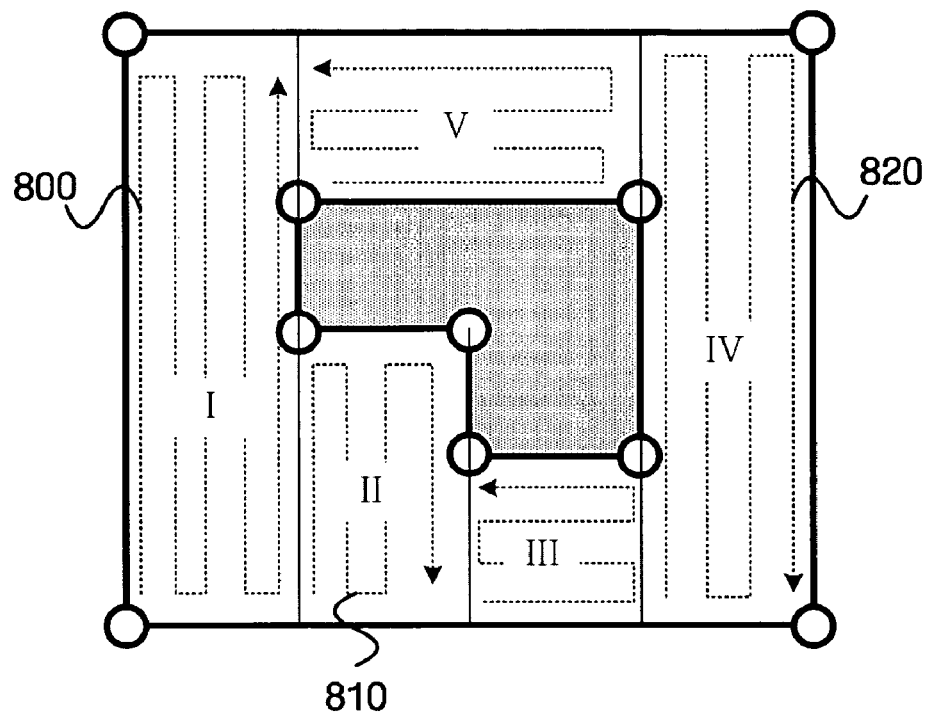
FIG. 8A illustrates the travel path of a mobile robot in each cell according to a method of cell decomposition that uses a grid map of the mobile robot according to an exemplary embodiment of the present invention.
Figure 8B:
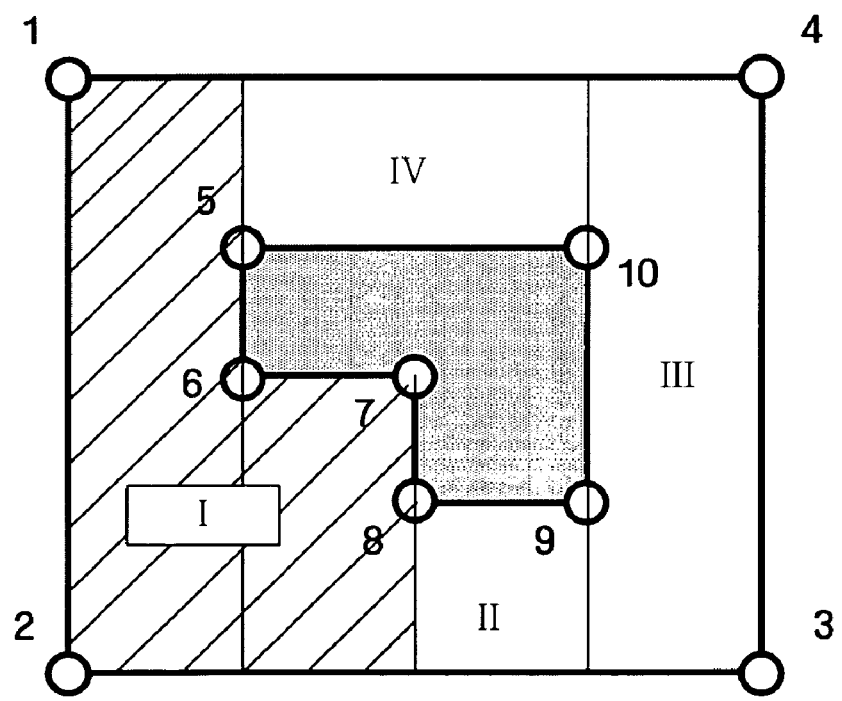
FIG. 8B illustrates the combining of cells in a method of cell decomposition that uses a grid map of a mobile robot according to an exemplary embodiment of the present invention.

FIG. 8A illustrates the direction of travel of a mobile robot 300 in each cell according to a method of cell decomposition that uses a grid map of the mobile robot 300 according to an exemplary embodiment of the present invention. FIG. 8B illustrates combining cells in a method of cell decomposition that uses a grid map of a mobile robot 300 according to an exemplary embodiment of the present invention.

After the cells are decomposed, a direction in which the robot 300 travels can be determined in each cell in operation S245. For example, when a cleaning robot 300 determines a direction of cleaning, and if cleaning is desired to be performed in units of cells as in present exemplary embodiment, a direction of cleaning can be determined with respect to each cell. Generally, the direction of cleaning is determined so that the robot 300 can go back and forth as illustrated in FIG. 8A. Accordingly, the cleaning direction in each cell can be determined so that the robot 300 can travel in straight lines and so that rotation of the robot 300 is minimized.

Basically, in order to determine a cleaning direction in a cell, a line having the highest occurrence probability in the cell can be selected. For this purpose, a Hough transform, a Radon transform or a histogram method that is used to determine an angle of a sweep-line that is most frequently occurring in the cell can be used. For example, the cleaning directions in cells I through V can be determined as 90 degrees, 90 degrees, 0 degrees, 90 degrees, and 0 degrees, respectively, as illustrated in FIG. 8A.

Also, if the cleaning direction in an adjacent cell is the same as that in the current cell, the robot 300 considers the cleaning pattern and direction in both cells to be the same, even though the cells are separated. Accordingly, if the cleaning directions are the same in adjacent cells, the cells can be regarded as one cell and merged (pruned) in operation S250. That is, since cells I and II in FIG. 8A are adjacent to each other and have identical cleaning directions, cells I and II can be merged and can be regarded as one cell. Accordingly, as illustrated in FIG. 8B, the entire cell can be finally decomposed into 4 cells.

Figure 9:
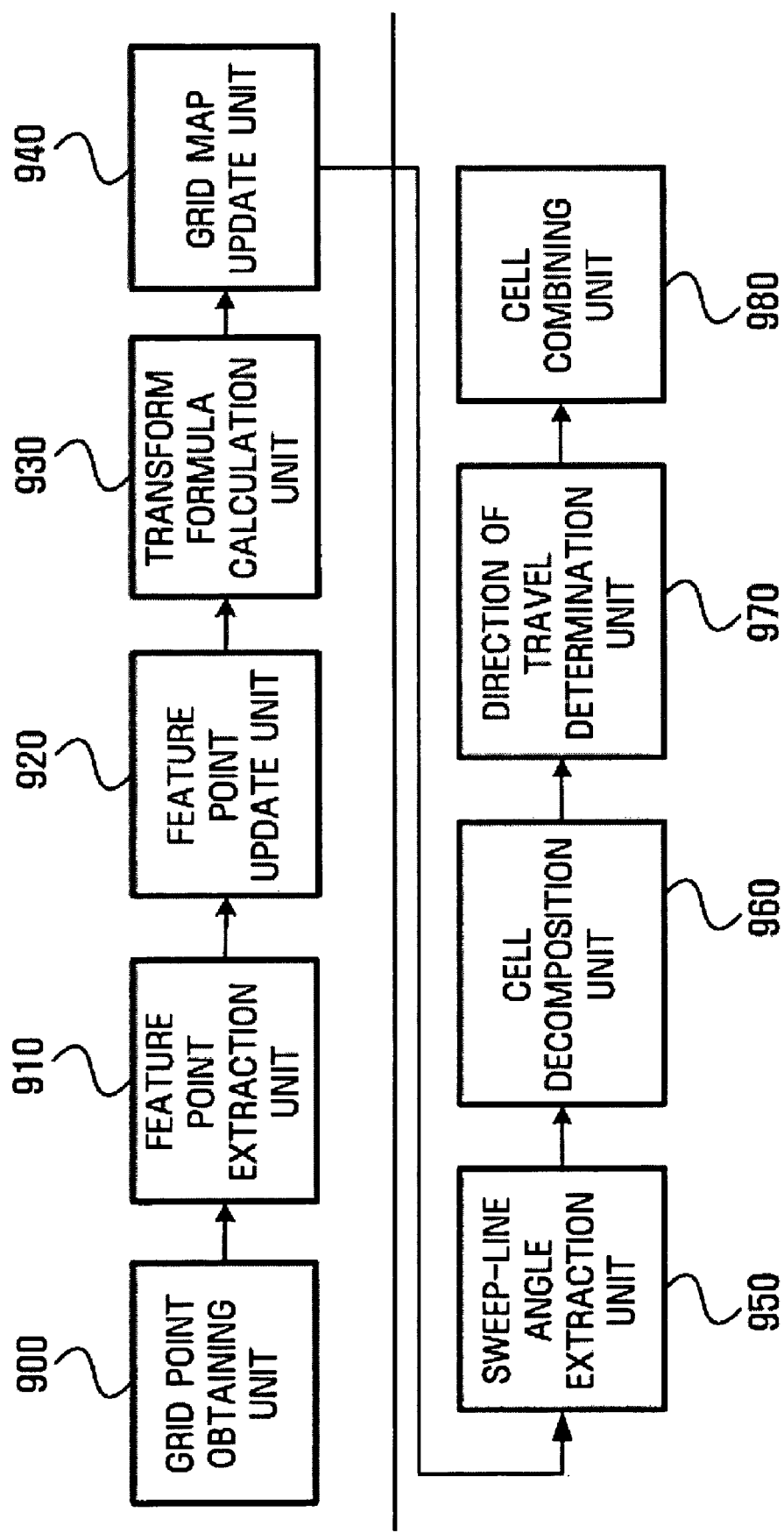
FIG. 9 is a block diagram of a mobile robot that performs cell decomposition using a grid map according to an exemplary embodiment of the present invention.

FIG. 9 is a block diagram of a mobile robot 300 that performs cell decomposition using a grid map according to an exemplary embodiment of the present invention.

The mobile robot 300 building a grid map according to an exemplary embodiment of the present invention may be composed of a grid map building unit 900, a feature point extraction unit 910, a feature point update unit 920, a transform formula calculation unit 930, and a grid map update unit 940 in order to build a grid map of a space in which the functions of the robot 300 are performed and in order to decompose the built grid map into one or more cells.

The grid map building unit 900 obtains grid points by measuring a distance to an inside wall of a space in which the robot 300 is positioned, or a distance to an obstacle, through one or more distance sensors mounted on the robot 300, and by processing the grid points as data, builds a grid map. In order to build the grid map, the robot 300 may obtain grid points by measuring distance data while traveling an area for which the robot 300 desires to build the grid map.

As the robot 300 establishes a plurality of grid points 330 by measuring the distance data with respect to the surrounding environment, a grid map having a kind of outline can be formed. As a result, feature points 310 and 320 that can determine a shape, such as an edge and corner of an object, can be extracted from the plurality of grid points. In order to extract a feature point, the RANSAC or split and merge algorithm can be used, in which, based on grid points obtained from distance data, a plurality of straight lines are recognized and intersection points of straight lines are recognized, so that a corner or an edge can be detected.

While the mobile robot 300 is traveling, the feature point update unit 910 can update the pose of the robot 300 and positions of feature points according to the SLAM algorithm. For example, the positions of the feature points can be corrected using the SLAM algorithm based on the EKF.

Accordingly, the transform formula calculation unit 920 calculates a transform formula which maps the corrected position of a feature point and the position of the feature point before the correction on a one-to-one basis. An Affine transform or a linear conformal transform can be used as the transform for the mapping. For example, when Affine transform is used, the transform matrix (T) satisfying equation 3 can be obtained.

After the transform matrix (T) is obtained, the grid map update unit 930 updates the entire grid map by performing the transform on all the cells of the grid map. By applying the transform matrix (T) to correct feature points to the entire grid map and matching the feature map with the grid map, the grid map update unit 930 can update the grid map. Accordingly, if the update grid map converges on a predetermined cell, the update grid map can be the grid map of the space in which the robot 300 is to perform jobs.

Using the elements described above, the mobile robot 300 can build a grid map. The mobile robot 300 decomposing a cell using a grid map according to an exemplary embodiment of the present invention may be composed of the grid map building unit 900, the feature point extraction unit 910, the feature point update unit 920, the transform formula calculation unit 930, the grid map update unit 940, a sweep-line angle extraction unit 950, a cell decomposition unit 960, a direction of travel determination unit 970 and a cell combining unit 980 in order to decompose the built grid map into one or more cells.

In order to decompose the grid map into cells, the sweep-line angle extraction unit 950 determines the direction of a sweep-line scanning the grid map. Accordingly, the sweep-line angle extraction unit 950 can determine an angle of a line appearing most frequently in the built grid map. For this purpose, by determining a line appearing most frequently in the grid map as the sweep-line direction line, the grid map can be conveniently decomposed into cells. In order to determine the sweep-line angle, a plurality of lines are extracted from the grid map through a Hough transform, a Radon transform or a histogram method and the direction of a line most frequently appearing among the extracted lines can be selected as the sweep-line angle direction line.

The cell decomposition unit 960 decomposes the grid map into cells by using the sweep-line and feature points. Scanning the grid map with the sweep-line at the angle extracted from the sweep-line angle extraction unit 950, the cell decomposition unit 960 detects positions at which the sweep-line meets feature points. At the positions where the sweep-line meets the feature points, the grid map can be decomposed into one or more cells. Accordingly, if the sweep-line meets a plurality of feature points, a plurality of cells can be generated.

The direction of travel determination unit 970 determines the direction of travel of the mobile robot 300 in each cell decomposed in the grid map. For example, if the mobile robot 300 is a cleaning robot 300, the direction of travel determination unit 970 can determine a direction in which the cleaning is performed.

Accordingly, in order for the robot 300 to perform efficient cleaning in the decomposed cells, the robot 300 needs to select a cleaning direction requiring less rotation. For this purpose, the direction of travel determination unit 970 extracts lines in a decomposed cell through a Hough transform, a Radon transform or a histogram method, and can determine the direction of a line appearing most frequently among the extracted lines as the direction of travel. In this case, the boundary determining a decomposed cell can also be recognized as a line so that the boundary can be used to determine a direction of travel.

The cell combining unit 980 combines two or more decomposed cells according to a predetermined criterion. As a criterion to combining decomposed cells (Pruning), the directions of travel of respective cells determined by the direction of travel determination unit 970 may be compared and if the directions match with each other, the adjacent cells can be combined into one cell. This is because if the directions of travel match, it is more efficient to make the robot 300 regard the adjacent cells as one cell and perform the cleaning.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include wireless transmission media including a carrier wave transmitting signals specifying instructions, data structures, data files, etc. from an access point coupled to a computing device or network. The medium/media may be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, or a combination of a software component and a hardware component, which performs certain tasks. A module may advantageously be configured to reside on the addressable storage medium/media and configured to execute on one or more processors. Thus, a module may include, by way of example, components, such as software components, application specific software component, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s).

The computer readable code/instructions and computer readable medium/media may be those specially designed and constructed for the purposes of the present invention, or they may be of the kind well-known and available to those skilled in the art of computer hardware and/or computer software.

Exemplary embodiments of the present invention described above have the following effects.

First, by matching the grid map and the feature point map, a grid map close to an actual shape can be built.

Secondly, by decomposing a cell into a plurality of cells with respect to the feature points and the sweep-line, the cell can be decomposed such that it is suitable for executing the function of the robot 300.

Thirdly, by determining a direction of travel appropriately in each cell, the robot 300 can efficiently perform jobs in cells after the cell is decomposed.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method of building a grid map of a mobile robot, comprising:
    obtaining grid points by sensing a distance to at least one of boundaries of an external space and an obstacle within the boundaries of the external space, and building the grid map;
    extracting feature points from the grid points;
    estimating pose of the robot after the robot moves, and updating the feature points using a SLAM (Simultaneous Localization And Map building) algorithm;
    determining a transform which transforms the feature points extracted from the grid points into the updated feature points;
    updating the grid map according to the transform;
    extracting an angle of a sweep-line appearing most frequently in the updated grid map;
    scanning the grid map according to the extracted sweep-line angle; and
    decomposing the grid map into cells by the sweep-line at a position in which the sweep-line meets a feature point.

2. The method of claim 1, wherein the sensing of the distance is performed using a distance measuring sensor.

3. The method of claim 2, wherein the sensor is one of an ultrasound sensor, infrared ray sensor, or laser sensor.

4. The method of claim 1, wherein the extracting of the feature points is performed using a random sample consensus (RANSAC) algorithm or a split and merge algorithm.

5. The method of claim 1, wherein the SLAM (Simultaneous Localization And Map building) algorithm is based on a Kalman filter.

6. The method of claim 1, wherein the transform is determined using an Affine transform or a linear conformal transform method.

7. The method of claim 1, wherein in the extracting of the angle of the sweep-line, the angle of the sweep-line appearing most frequently in the updated grid map is extracted by using any one of a Hough transform, a Radon transform, and a histogram.

8. The method of claim 1, further comprising determining a direction of travel of the robot based on the extracted angle of the sweep-line appearing most frequently in the decomposed cells.

9. The method of claim 8, further comprising combining adjacent decomposed cells in which the robot has identical directions of travel into one cell.

10. A mobile robot for building a grid map, comprising:
    a grid map builder to obtain grid points by sensing a distance to at least one of boundaries of an external space and an obstacle within the boundaries of the external space, and to build the grid map;
    a feature point extractor to extract feature points from the grid points;
    a feature point updater to estimate pose of the robot after the robot moves, and updating the feature points by using a SLAM (Simultaneous Localization And Map building) algorithm;
    a transform determiner to determine a transform which transforms the feature points extracted by the feature point extractor into feature points updated by the feature point updater;
    a grid map updater to update the grid map according to the transform;
    a sweep-line angle extractor to extract an angle of a sweep-line appearing most frequently in the updated grid map; and
    a cell decomposer to scan the grid map according to the extracted sweep-line angle and to decompose the grid map into cells by the sweep-line at a position in which the sweep-line meets a feature point.

11. The robot of claim 10, wherein the grid map builder obtains the grid points by sensing the distance using one of an ultrasound sensor, infrared ray sensor, or laser sensor.

12. The robot of claim 10, wherein the feature point extractor extracts feature points using a random sample consensus (RANSAC) algorithm or a split and merge algorithm.

13. The robot of claim 10, wherein the SLAM (Simultaneous Localization And Map building) algorithm is based on a Kalman filter.

14. The robot of claim 10, wherein the transform determiner determines the transform using an Affine transform or a linear conformal transform.

15. The robot of claim 10, wherein the sweep-line angle extractor extracts the angle of the sweep-line appearing most frequently in the updated grid map by using one of a Hough transform, a Radon transform, and a histogram.

16. The robot of claim 10, further comprising a direction of travel determiner to determine direction of travel of the robot based on the extracted angle of the sweep-line appearing most frequently in the decomposed cells.

17. The robot of claim 16, further comprising a cell combiner to combine adjacent cells, in which the robot has identical directions of travel among the decomposed cells, into one cell.

18. At least one computer readable medium storing computer readable instructions to implement the method of claim 1.

19. A method of building a grid map of a mobile robot, comprising:
    building the grid map based on grid points obtained by sensing a distance from the robot to objects;
    extracting feature points from the grid points;
    estimating pose of the robot after robot movement, and updating the feature points using a SLAM (Simultaneous Localization And Map building) algorithm;
    determining a transform which transforms the feature points extracted from the grid points into the updated feature points;
    updating the grid map according to the transform;
    extracting an angle of a sweep-line appearing most frequently in the updated grid map;
    scanning the grid map according to the extracted sweep-line angle; and
    decomposing the grid map into cells by the sweep-line at a position in which the sweep-line meets a feature point.

20. At least one computer readable medium storing computer readable instructions to implement the method of claim 19.

21. A mobile robot for building a grid map, comprising:
    a grid map builder to build the grid map based on grid points obtained by sensing a distance from the robot to objects;
    a feature point extractor to extract feature points from the grid points;
    a feature point updater to estimate pose of the robot after the robot moves, and updating the feature points by using a SLAM (Simultaneous Localization And Map building) algorithm;
    a transform determiner to determine a transform which transforms the feature points extracted by the feature point extractor into feature points updated by the feature point updater;
    a grid map updater to update the grid map according to the transform;
    a sweep-line angle extractor to extract an angle of a sweep-line appearing most frequently in the updated grid map; and
    a cell decomposer to scan the grid map according to the extracted sweep-line angle and to decompose the grid map into cells by the sweep-line at a position in which the sweep-line meets a feature point.

* * * * *